United States Patent
Hamid (10) Patent No.: US 9,083,746 B2
(45) Date of Patent: Jul. 14, 2015

(54) METHOD OF PROVIDING ASSURED TRANSACTIONS USING SECURE TRANSACTION APPLIANCE AND WATERMARK VERIFICATION

(75) Inventor: Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 899 days.

(21) Appl. No.: 12/289,053

(22) Filed: Oct. 20, 2008

(65) Prior Publication Data

US 2009/0106556 A1 Apr. 23, 2009

Related U.S. Application Data

(60) Provisional application No. 60/960,916, filed on Oct. 19, 2007.

(51) Int. Cl.
*H04L 9/32* (2006.01)
*H04L 29/06* (2006.01)
(Continued)

(52) U.S. Cl.
CPC .............. *H04L 63/18* (2013.01); *G06F 21/606* (2013.01); *G06F 2221/2119* (2013.01); *H04L 63/0838* (2013.01); *H04L 63/123* (2013.01); *H04L 63/166* (2013.01); *H04L 63/168* (2013.01); *H04W 12/06* (2013.01)

(58) Field of Classification Search
CPC . G06F 21/606; G06F 221/2119; H04L 63/18; H04L 63/0838; H04L 63/123; H04L 63/166; H04L 63/168; H04W 12/06
USPC ............................................. 713/176; 380/30
See application file for complete search history.

(56) References Cited

U.S. PATENT DOCUMENTS

| 5,778,071 A | 7/1998 | Caputo et al. |
| 5,917,913 A | 6/1999 | Wang |
| 5,956,404 A | 9/1999 | Schneier et al. |

(Continued)

FOREIGN PATENT DOCUMENTS

| EP | 1 055 989 A1 | 11/2000 |
| EP | 1 433 614 A1 | 6/2004 |

(Continued)

OTHER PUBLICATIONS

ISA/CA, "International Search Report", dated Jan. 28, 2009, pp. 1 to 11.

(Continued)

*Primary Examiner* — Krista Zele
*Assistant Examiner* — James Forman
(74) *Attorney, Agent, or Firm* — Dorsey & Whitney LLP (57) ABSTRACT

Disclosed is a method of improving electronic security by establishing a path between a user and a secure transaction appliance. The secure transaction appliance receiving information destined for the user which includes a tagged portion, said tagged portion triggering the secure transaction appliance to forward the information to the computer from which the request was issued, and to seeking an electronic signature to verify the content or transaction by transmitting a watermark, tagged portion of the content, or similar electronic content. The secure trusted path providing the user with the tagged portion incorporating additional elements such as a watermark, or in some embodiments only the additional elements, upon a personalized security device associated with the user making interception or manipulation more complex and difficult.

14 Claims, 3 Drawing Sheets

(51) Int. Cl.
  *G06F 21/60*   (2013.01)
  *H04W 12/06*   (2009.01)

(56) References Cited

U.S. PATENT DOCUMENTS

| | | | |
|---|---|---|---|
| 6,003,135 A | 12/1999 | Bialick et al. | |
| 6,018,724 A | 1/2000 | Arent | |
| 6,279,824 B1* | 8/2001 | Park | 235/379 |
| 6,425,081 B1 | 7/2002 | Iwamura | |
| 6,757,827 B1 | 6/2004 | Geist | |
| 6,952,497 B1 | 10/2005 | Hollstrom et al. | |
| 6,983,057 B1 | 1/2006 | Ho et al. | |
| 7,042,470 B2 | 5/2006 | Rhoads et al. | |
| 7,069,451 B1 | 6/2006 | Ginter et al. | |
| 7,113,615 B2 | 9/2006 | Rhoads et al. | |
| 7,162,637 B2 | 1/2007 | Wakao et al. | |
| 7,216,237 B2 | 5/2007 | Vanstone | |
| 7,275,160 B2 | 9/2007 | Pearson et al. | |
| 7,308,577 B2 | 12/2007 | Wakao | |
| 7,403,641 B2 | 7/2008 | Nakamoto et al. | |
| 7,506,163 B2 | 3/2009 | Mansz et al. | |
| 7,552,333 B2 | 6/2009 | Wheeler et al. | |
| 7,555,655 B2 | 6/2009 | Smith et al. | |
| 7,568,111 B2 | 7/2009 | Alve et al. | |
| 7,706,565 B2 | 4/2010 | Levy et al. | |
| 7,757,089 B2 | 7/2010 | Kusuda et al. | |
| 7,930,548 B2 | 4/2011 | Wakao | |
| 8,060,447 B2 | 11/2011 | Hamid et al. | |
| 8,321,353 B2 | 11/2012 | Hamid et al. | |
| 2001/0056410 A1 | 12/2001 | Ishigaki | |
| 2002/0042883 A1* | 4/2002 | Roux et al. | 713/201 |
| 2002/0073042 A1 | 6/2002 | Maritzen et al. | |
| 2002/0128969 A1* | 9/2002 | Parmelee et al. | 705/42 |
| 2002/0143649 A1 | 10/2002 | Wise | |
| 2003/0231785 A1 | 12/2003 | Rhoads et al. | |
| 2004/0022444 A1 | 2/2004 | Rhoads | |
| 2004/0099740 A1 | 5/2004 | Chresand et al. | |
| 2005/0078851 A1 | 4/2005 | Jones et al. | |
| 2005/0144063 A1 | 6/2005 | Spector | |
| 2006/0080538 A1 | 4/2006 | Kusuda et al. | |
| 2006/0135206 A1 | 6/2006 | Louks et al. | |
| 2006/0179304 A1* | 8/2006 | Han | 713/168 |
| 2006/0282676 A1 | 12/2006 | Serret-Avila et al. | |
| 2006/0287963 A1 | 12/2006 | Steeves et al. | |
| 2007/0053513 A1 | 3/2007 | Hoffberg | |
| 2007/0130618 A1* | 6/2007 | Chen | 726/8 |
| 2007/0271599 A1* | 11/2007 | Rosenstein | 726/4 |
| 2008/0061137 A1 | 3/2008 | Dutta et al. | |
| 2008/0082821 A1* | 4/2008 | Pritikin | 713/169 |
| 2008/0098464 A1 | 4/2008 | Mizrah | |
| 2008/0127319 A1* | 5/2008 | Galloway et al. | 726/9 |
| 2008/0133415 A1 | 6/2008 | Ginter et al. | |
| 2008/0141365 A1 | 6/2008 | Soegtrop | |
| 2008/0175377 A1 | 7/2008 | Merrill | |
| 2008/0229109 A1 | 9/2008 | Gantman et al. | |
| 2009/0049301 A1 | 2/2009 | Hamid et al. | |
| 2009/0235081 A1 | 9/2009 | Hamid et al. | |
| 2009/0307133 A1 | 12/2009 | Holloway et al. | |
| 2010/0287376 A1* | 11/2010 | De La Puente Arrate et al. | 713/176 |
| 2012/0060036 A1 | 3/2012 | Hamid et al. | |

FOREIGN PATENT DOCUMENTS

| | | |
|---|---|---|
| JP | 2002-358471 A | 12/2002 |
| WO | WO03048939 A1 | 6/2003 |
| WO | WO 2006/091368 | 8/2006 |

OTHER PUBLICATIONS

Soriente et al. "HAPADEP: Human-Assisted Pure Audio Device Pairing", Computer Science Department, University of California Irvine, 2008, 16 pages.

* cited by examiner

METHOD OF PROVIDING ASSURED TRANSACTIONS USING SECURE TRANSACTION APPLIANCE AND WATERMARK VERIFICATION

FIELD OF THE INVENTION

The invention relates to providing assured transactions and more particularly to establishing trusted communication paths between correspondents and verification of website identities.

BACKGROUND OF THE INVENTION

In recent years electronic commerce (e-commerce) has been the focus of significant attention as Internet-related sales grew at rates of 25 percent or more. Despite this in 2006 overall online sales within the US excluding travel purchases, represented only approximately 6 percent of US retail sales. In 2007 including travel this figure is expected to increase 18 percent to approximately US$260 billion.

"US Retail E-Commerce: Entering the Multi-Channel Era" published by e-Marketer in May 2007 outlines the prevalent trend for consumers to use the Internet as a product research tool. Hence, at present retailers who effectively build bridges between their stores and web sites stand to be the big winners in the research-online/buy-in-store era. Hampering e-commerce, and therefore its growth, is the prevalent view of users that e-commerce has many privacy and security issues, of which a central aspect is that there is no reliable way to ensure that the website a user wishes to access, make purchases therefrom, or provide personal information to is in fact the correct website and not an imposter purporting to be the intended target website. The non-physical nature of the Internet renders traditional methods of physically marking media with a seal or signature, for various business, commerce, and legal purposes, not practical. Rather, some mark must be coded into the information itself in order to identify the source and authenticate the contents.

In commerce, whether online or face-to-face, the client and the merchant must provide identification, authentication and authorization. Identification is the process that enables recognition of a user described to an automated data processing system and authentication is the act of verifying the claimed identity of an individual, station or originator, and finally authorization is the granting of the right of access to a user, program, or process.

Prior art solutions to the problems of identification, authentication, confidentiality, authentication, integrity and non-repudiation in information systems have focused heavily on the application of cryptography and/or so-called "Smart Cards". For confidentiality, encryption is used to scramble information sent between users so that eavesdroppers cannot understand the data's content. Authentication usually employs digital signatures to identify the author of a message such that the recipient of the message can verify the identity of the person who signed the message. Digital signatures can be used in conjunction with passwords or as an alternative to them.

Message integrity, if considered, is typically determined by methods that verify that a message has not been modified, such as by using message digest codes. Non-repudiation describes the creation of cryptographic receipts so that an author of a message cannot falsely deny sending a message. Thus the Internet reveals the full complexity of trust relationships among people, computers, and organizations.

Today, the dominant approach to authentication by digital signatures uses public-key cryptographic techniques employing two related keys, a public key and a private key. In public-key cryptography, the public key is made available to anyone who wants to correspond with the owner of the corresponding private key. The public key can be used to verify a message signed with the private key or encrypt messages that can only be decrypted using the private key. The secrecy of messages encrypted this way, and the authenticity of the messages signed this way relies on the security of the private key. Thus, the private key is kept secret by the owner in order to protect the key against unauthorized use.

Traditionally "Smart Cards" have been used as signing tokens for authenticating a user, wherein "Smart Cards" is merely an alternative name for a microprocessor card, in that it refers to a card that is 'smart', and is not to be confused with the registered trademark of Groupmark. "Smart Cards" place digital certificates, cryptographic keys and other information on a PIN-protected token carried by the end-user, which is more secure than storing it on a computer device which may be vulnerable to unauthorized access.

All the cryptographic algorithms involving the private key such as digital signatures and key exchanges are performed on the card. However, whilst users are assured a modicum of integrity and privacy of the data exchanged they are trusting that the website they are accessing really is the one they want and not a malicious website. One reason cryptographic algorithms have become so widespread is the fact that the private key need not be revealed outside of the token. However, one of the disadvantages of "Smart Cards" is that the owner is not protected from abuse of the "Smart Card". For example, because of the lack of a user interface, such as a display screen, the owner may not be sure about the originating server of the actual message being signed with the "Smart Card". Accordingly for example, a user executing a purchase with eBay does not know that the form requesting details of a financial instrument, such as a credit card, is actually being provided by a Korean webpage rather than the legitimate webpage.

Another approach adopted in the prior art has been to eliminate the "Smart Card" and implement the solutions by means of a personalized device, such as a wireless application protocol (WAP) capable mobile phone or wireless personal digital assistant (PDA), the personalized devices then providing the signing token. Such a personalized device can store private key and sign transactions on behalf of its owner. In such a situation, the holder of the personalized device is assumed to be its rightful owner or authorized representative as determined by an appropriate access-control mechanism, and further the information being provided is assumed to be coming from the legitimate web server or web page rather than a malicious source.

However, there exists substantial risk for fraud in either approach. In the first approach when the message is prepared on a PC and conveyed to the personalized device the integrity of the message may be compromised. This scenario applying for instance where the client wishes to use the larger viewing area or speed of the PC to perform the browsing, item selection and transaction aggregation, prior to completing the transaction on the personalized device by signing. The signed data message is transmitted via the personalized device. The personalized device thus acts both as a signing token and as a transmitting device. In this situation, it is assumed that the external computer can be trusted and that this computer does not contain malicious software (malware) or has been programmed by unscrupulous individuals to alter the content of the message. Should the data presented for signing on the personalized device contain different information from that displayed, then the owner of the private key would then sign fraudulent or financially harmful transactions. A common malware being the so-called "man-in-the-middle" attack (MITM) and incorporating phishing and substitution attacks.

In the second situation, wherein all activities are contained within the personalized device then one potential fraud arises when the personalized device operating system becomes corrupted, such as, by unintentionally installed software containing malicious code, script embedded in messages, or by compromise of the personalized device operating system via security holes. This malware can then alter the contents of transactions, as described above. Further, there is greater potential for fraud as transactions could be created, signed, and transmitted without the owner evening being aware they are occurring. For the client it would be very difficult, as prima facie the personalized device's owner appears to have sanctioned the data message by appending a valid signature.

Accordingly, it is an object of the present invention to mitigate these disadvantages by establishing a secure trusted path between a client and a secure transaction server disposed between client and the institution seeking an electronic signature before any request for signature and electronic transaction activities occur. The present invention therein utilizing the secure trusted path to provide the client with an image or an indication of an image on a personalized device that cannot be intercepted, inserted, or manipulated by malware to verify that the image within the displayed transaction on the clients primary computing device, such as a PC is authentic.

SUMMARY OF THE INVENTION

In accordance with an embodiment of the invention there is provided a method for authorizing digital content comprising the steps of:
(i) receiving at a secure transaction device a tag relating to a known portion of electronic content received at a secure transaction device for transmission to a user;
(ii) associating with the tag electronic data for use in verifying the known portion of the electronic content associated with the tag;
(iii) establishing a first communication path between the secure transaction device and a security module;
(iv) establishing a second communication path between the secure transaction device and a second other system; and
(v) initiating an authorization process for being performed at least in conjunction with the security module.

In accordance with another embodiment of the invention there is provided a method for digital authorization comprising the steps of:
(i) providing at least the known portion of the electronic content associated with the tag to a user, the known portion of the electronic content for at least one of presentation to, verification by, and authorization by the user and being provided to the user via the second other system; and
(ii) providing the electronic data associated with the tag to the user for at least one of presenting, verifying, and authorizing the electronic content, the electronic data being provided to the user via the security module.

In accordance with another embodiment of the invention there is provided a device for digital authorization comprising:
(i) providing a transactor in communication with a network and comprising a memory for storing information relating to at least one possible transaction of a plurality of possible transactions;
(ii) providing a user system associated with a user, the user system having at least a primary computer and a security module, the primary computer connected to the network and providing the user with a process for allowing the user to view the plurality of transactions provided by the transactor;
(iii) providing a secure transaction device, the secure transaction device disposed within a first communication path between the transactor and the primary computer of the user;
(iv) establishing a trusted path between the secure transaction device and the security module,
(v) establishing an active transaction between the transactor and user, the active transaction being one of the plurality of possible transactions;
(vi) providing a request to the user for a digital signature from the transactor via the first communication path in respect of the active transaction, the request having a tag associated;
(vii) recognizing the tag upon receiving the request at the secure transaction device and associating electronic data with the request and tag;
(viii) providing the request to the user for display on the primary computer via a first communications path; and
(ix) providing the electronic data associated with the request to the user for display on the security module via the trusted path.

In accordance with another embodiment of the invention there is provided a method for digital authorization comprising the steps of:
(i) providing a memory device having a processor therein and a display;
(ii) providing a first communication path between a server and a user system associated with a user, the first communication path including a secure transaction device disposed between the server and the user system;
(iii) providing a trusted path between the secure transaction device and the memory device via a second communication path;
(iv) providing to the memory device from the secure transaction device at least one of a watermark and a first known portion of a first document, the watermark associated with a tag provided by server and referencing a second known portion of the first document; and
(v) providing to the user system the first document for display and for at least one of verification and authorization thereof.

In accordance with another embodiment of the invention there is provided a method for digital authorization comprising the steps of:
(i) verifying the first document in dependence upon at least one of the watermark and the second known portion of the first document, the watermark presented to the user by the memory device; wherein
when the verification is indicative of other than tampering; providing an indication to the memory device for digitally signing the first document and providing the digital signature thereto to the server via the trusted path.

In accordance with another embodiment of the invention there is provided a method for digital authorization comprising the steps of:
(i) receiving from a transactor at a secure transaction device electronic content and a tag associated with a known portion of the electronic content, the electronic content for transmission to a user;
(ii) modifying at least the known portion of the electronic content by the addition of first electronic data determined in dependence upon at least one of the transactor, the user, the tag, and the electronic content;

(iii) associating with the tag second electronic data, the second electronic data providing for the user an association with the first electronic data; and (iv) storing with a memory of the secure transaction device the modified electronic content and second electronic data.

In accordance with another embodiment of the invention there is provided a device for digital authorization comprising:

(a) a first input port for receiving electronic content from a transactor for transmission to a user, the electronic content received from a first communication path and intended for display by a user;

(b) a first output port for transmitting via a second communication path at least one of a verification and an authentification of the electronic content to the transactor from the user;

(c) a plurality of processors electrically connected to the first input port and the first output port, the plurality of processors for identifying at least a known portion of the electronic content, modifying the known portion of the electronic content by the addition of first electronic data, associating with the first electronic data second electronic data, transmitting the first and second electronic data, receiving at least one of a verification and authentification of the electronic content from the user, and transmitting the at least one of a verification and authentification of the electronic content to the transactor; the first and second electronic data determined at least in dependence upon one of the user and the electronic content;

(d) a second output port supporting a third communication path for transmission of at least the modified electronic data to the user;

(e) a third output port supporting a fourth communication path for transmission of at least the second electronic data to the user; and (f) a second input port for receiving from a fifth communication path at least one of a verification and authentification of the electronic content from the user.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Within the disclosure and claims the term "appliance" refers to a physical module or a virtual module. For example, "appliance" includes but is not limited to a server, a custom hardware solution, a virtual server, and a virtual module.

Figure 1:
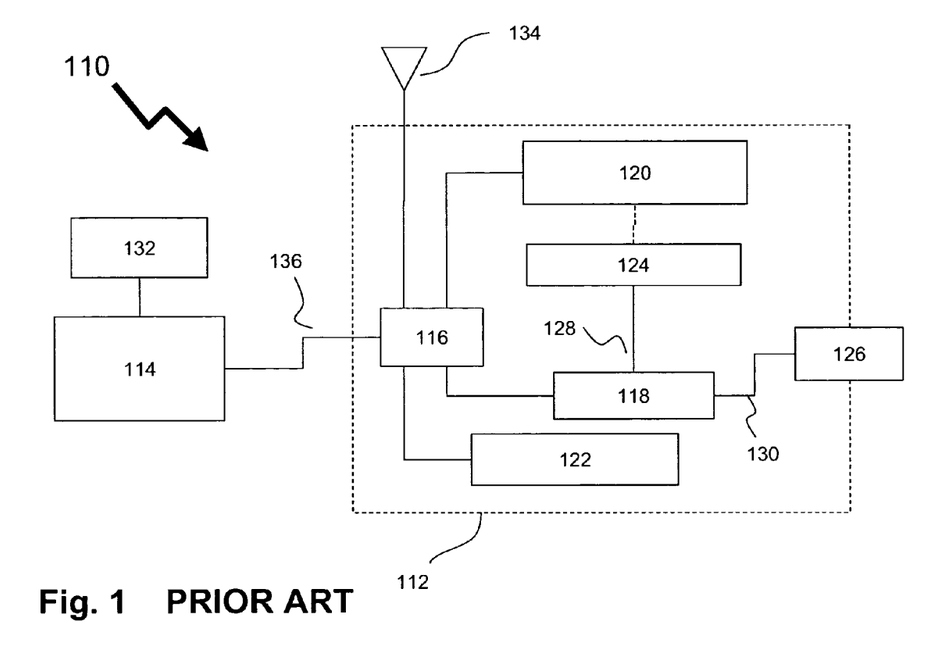
FIG. 1 illustrates a prior art approach to providing a trusted message for signature in respect to a transaction by a client according to Vanstone [U.S. Pat. No. 7,216,237].

FIG. 1 illustrates a prior art approach to providing a trusted message for signature by a client according to Vanstone [U.S. Pat. No. 7,216,237] where a system 110 for verifying the integrity of a data message between a first device 112 and a second device 114 that are in communication with each other. The first device 112 is designated as a personalized device 112 and the second device 114 is designated as a personal computer 114. According to Vanstone the personalized device 112 is a mobile phone controlled by the device main processor 116 including a secure module 118. The secure module 118 is adapted to operate independently of the device main processor 116, so that the internal state of the secure module 118 cannot be readily reverse engineered and or that its interactions with the underlying hardware are not maliciously intercepted and reinterpreted. Coupled to the device main processor 116 is a device display 120, which provides textual and graphical displays that prompt a user for input information. A keyboard 122 coupled to the device main processor 116 facilitates the input of information. Similarly, the secure module 118 is in communication with a secure display 124, and a secure input device, preferably a trusted button 126.

The secure display 124 is wholly under the control of the secure module 118 and coupled thereto by secure path 128, and the trusted button 126 is in direct communication with the secure module 118 via secure path 130. Thus, the secure paths 128 and 130 are logically isolated and distinct from any other paths. The secure module 118, the secure I/O devices 124 and 126, and the secure paths 128 and 130 form trusted paths between said secure module 118 and a user of the personalized device 112. The personal computer 114 may be a laptop computer, a PC, a workstation and includes an external display 132. The data message for authentication is transmitted from the external computer 114 via a communication path 136 to the personalized device 112 and is then received by the message transceiver 134. The data message for authentication by the personalized device 112 is communicated from the personal computer 114 via communication path 136 or through a wireless interface via antenna 134. Thus, the personalized device 112 receives data, and is used to sign a data message generated on the personal computer 114. In operation, the personal computer 114 assembles the data comprising the portion of the data message to be signed, preferably displaying the appropriate data message on the external display 132, and conveys the data to the personalized device 112 via the path 136.

The device main processor 116 conveys the data to the secure module 118, optionally displaying the same data on the display 120. The secure module 118 displays the data message, or a portion of the message, on the secure display 124 in an appropriate format. In order to verify the integrity of the data, the user compares the data message on the external display 132 and the data message, or portion of it, with the data message on the secure display 124. If there is a match between the two data messages, the user instructs the secure module 118, specifically a signature generator process to generate a signature by actuating the trusted actuator in the form of trusted button 126.

In the system 110 presented by Vanstone the trusted path is established only between the personal computer 114 and personalized device 112, both of which belong to the same user. As such the trusted path exists only between the personal computer 114 and personalized device 112, and is used solely for the portion of the data message to be signed. As such Vanstone does not protect the user from MITM attacks on the personal computer 114 that adjust the contents of the data message such that the user is not aware of the content of the full message they are signing. The personal computer 114 is also not secured in its communications to the party from whom the message to be signed originates providing further opportunities in the communications overall for fraudulent transactions or extraction of the user's signature. The user therefore would benefit from the establishment of a secure trusted path between the transactor website and the client.

Figure 2:
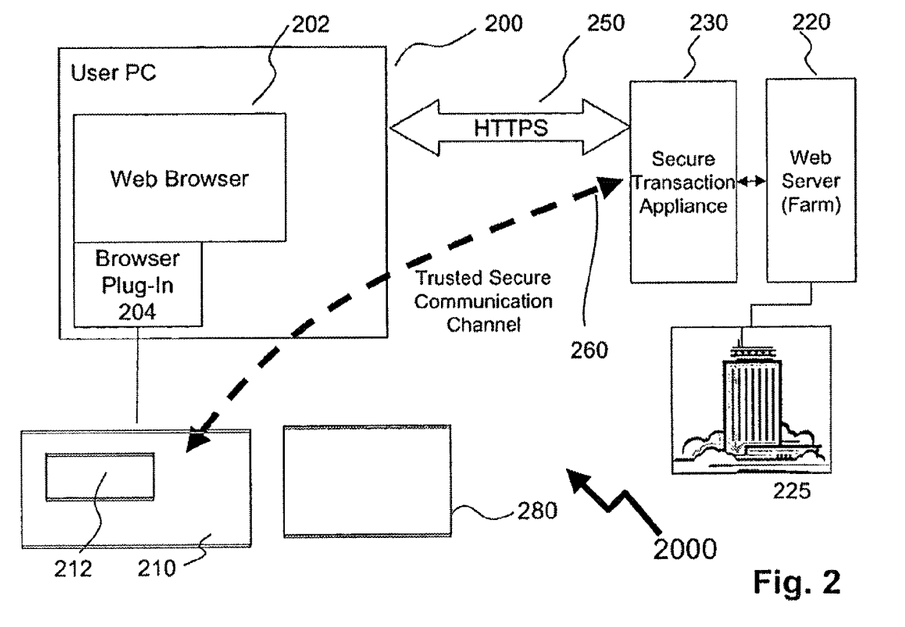
FIG. 2 illustrates a first embodiment of the invention wherein a secure transaction is established between the web server of the transacting party and the client allowing a trusted secure path to be established with a secure demountable memory device belonging to the client.

An embodiment of a trusted path 260 established between a transactor 225 to user 280 is shown in FIG. 2 with reference to the transaction system 2000. As such user 280 wishing to perform at least one transaction with the transactor 225 initiates the establishment of a secure communications channel by connecting their security module 210 to their laptop computer 200, and initiating a request to the transactor 225. The security module 210 interfacing to an ultra-thin client, browser plug-in 204, within the user's laptop computer 200 which forms a part of the web browser 202. Both the transactor 225 and laptop computer 200 are interconnected via a network in the form of the World Wide Web (commonly referred to as Internet, not shown for clarity). Unknown to the user 280 the web server or web server farm 220 hosting the web based services of transactor 225 is accessed via secure transaction appliance (STA) 230 which handles all external communications to the Internet, and communications to the web server farm 220.

Recognizing the request from within the web browser 202 that the user 280 is accessing a known portion of the transactor 225 as relating to a financial transaction then STA 230 initiates a secure HTTP process 250 (HTTPS) with the laptop computer 200. The transactor 225 receives the request from the user 280, retrieves the content and provides this to the user's laptop computer 200. The content is parsed through the STA 230, which notes that a portion of the content has been specially marked. The STA 230 transmits to the user 280 content for display on the web browser 202, and also sends the specially marked portion of the content to the security module 210 of the user 280, whereupon it is displayed on display 212. The specially marked portion of the content sent to the security module 210 is provided via a trusted secure communication channel 260. According to this embodiment trusted secure communication channel 260 is via the HTTPS process 250 whereupon the ultra thin client browser plug-in 204 extracts this portion of the content and transfers this to the security module 210. Alternatively, the trusted secure communication channel 260 between the STA 230 and the security module 210 uses HTTPS 250 as a transport protocol and forms a logical communication path within HTTPS 250. In this manner the same web browser 202 and server session are employed. Optionally, another protocol is used to provide the required digital transport.

The specially marked portion of the content representing a request for signing the content is sent to the web browser 202, for example to verify a request to transfer funds from the user 280 personal bank account to transactor 225 to provide a service. In order to confirm the fund transfer transaction the user 280 enters their authorization into the security module 210, i.e. their digital signature, and this is transmitted from the security module to the transactor 225 using the HTTPS process 250 in operation. The STA 230 intercepts the authorization in the HTTPS 250 communication and converts this communication into a standard HTTP message format that web servers of transactor 225 employ.

Alternatively, the STA 230 watermarks the content to be provided to the user 280, and then sends the watermark to the user's security device 210 and the watermarked content to the users' laptop 200. Similarly, the action the user 280 requests from the transactor 225 may for example be providing a signature to validate an electronic document, providing security information to access online services or a check out list at an on-line store requiring confirmation.

Further whilst the embodiment of transaction system 2000 utilizes a trusted secure communication channel 260 via same HTTPS 250 it is apparent that other methods of communicating between the STA 230 and the security module 210 are feasible, including but not limited to separate communication to the laptop 200 and thereupon to the security module 210 without engaging the web browser 202 or browser plug-in 204, and wireless communications by a completely separate path to provide enhanced security by decoupling the two communications. Further, where the browser plug-in 204 has been described supra as an ultra-thin client other options include but are not limited to a thin-client and a discrete application, each of which provides the necessary interfacing between the security module 210 and the web browser 202.

For digital watermarking, for example, a document provided to the web browser 202 is watermarked and an indication of said watermark is provided to the user via the security module 210. A digital watermark is preferably an embedded watermark within the transaction document, and verification of the watermark is performed based upon information provided via the trusted secure communication path 260. For example, an image of the watermark is provided via the trusted secure communication path 260 to the security module 210. Alternatively, the information provided on the user's security module 210 is an indication of the information provided by the transactor 225 and displayed to the user 280, such as on their laptop computer 200. For example, the information provided on the user's security module 210 comprises "George Washington", indicating that the information provided by the transactor should include a watermark of George Washington to be valid. In another example, the information comprises "Trisha's Date of Birth" indicating that the watermark is a date of birth of Trisha. Such approaches making false digital signature for fraudulent transactions avoidable as every transaction is verified using a different one of a plurality of allowed watermarks. Optionally, the watermarks are selected from a group of general watermarks. Alternatively, the watermarks are selected from a group specific to the user. Further alternatively, the watermarks are selected from a group including some specific to the user and others that are generic.

Figure 3:
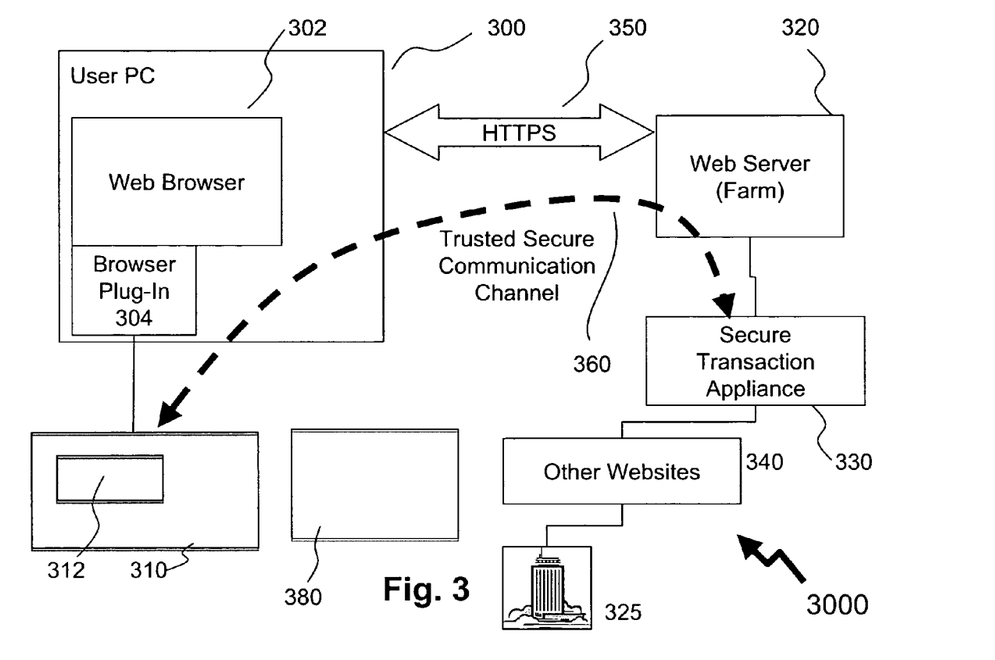
FIG. 3 illustrates a second embodiment of the invention wherein a secure transaction is established between the web server of another party brokered by the transacting party and the client and a trusted secure path is established with a secure demountable memory device belonging to the client.

A second embodiment of the invention is presented in respect of a trusted path 3000 from transactor 325 to user 380 as shown in FIG. 3. A user 380 wishing to perform at least one transaction with the transactor 325 initiates a secure communications channel by connecting their security module 310 to their laptop computer 300 and providing a request to the transactor 325. The security module 310 interfaces with an ultra-thin client, browser plug-in 304, within the user's laptop computer 300. Both the transactor 325 and laptop computer 300 are interconnected via a network in the form of the World Wide Web (commonly referred to as Internet, not shown for clarity). Unknown to the user 380 the transactor 325 website is actually accessed though a web server farm 320 hosting the web based services of many organizations and additionally facilitating access to other web sites such as transactor 325. As the web server farm 320 receives content from external websites 340 including transactor 325, a secure transaction appliance (STA) 330, which handles all external communications to the Internet from the web server farm 320, sits between external websites 340 and web server farm 320 and therein between the user 380 and the transactor 325.

Recognizing the request from within the web browser 302 that the user 380 is accessing a known portion of the transactor 325 website relating to a financial transaction, the laptop 300 and web server farm 320 cooperate to provide a secure HTTP process 350 (HTTPS) therebetween. Using the HTTPS process 350 the request from the user 380 is forwarded from the web server farm 320 to the external websites 340 and thereafter to the transactor 325. The transactor 325 receiving the request from the user 380 retrieves the content and provides this back via the external websites 340 and web server farm 320 to the user's laptop computer 300. In doing so the content is parsed through the STA 330 which notes that a portion of the content has been specially marked for enhanced verification and validation. In doing so the STA 330 transmits to the transactor 325 content for display on the web browser 302, but also sends the specially marked portion of the content to the security module 310 of user 380, whereupon it is displayed on display 312. The specially marked portion of the content sent to the security module 310 is provided via a trusted secure communication channel 360. According to this embodiment trusted secure communication channel 360 is via the HTTPS process 350 whereupon the ultra thin client browser plug-in 304 extracts this portion of the content and transfers this to the security module 310.

The specially marked portion of the content comprises a request for signing the content sent to the web browser 302, the request for example for verifying a request to transfer funds from a personal bank account of the user 380 to transactor 325 to trigger provision of a service. In order to confirm the fund transfer transaction, the user 380 enters their authorization into the security module 310, i.e. their digital signature, and this is transmitted from the security module to the transactor 325 using the HTTPS process 350 in operation. The web server farm 320 in identifying the communication as part of trusted secure communication channel 360 automatically forwards the content to the STA 330. The STA 330 intercepts the authorization in the trusted secure communication channel 360 and converts this communication into a standard HTTP message format that web servers of transactor 325 are accustomed to employing.

In contrast to the STA 230 of the first embodiment the STA 330 of the second embodiment, the STA 330 can have an independent set of keys from that used by any other secure socket layer (SSL) connection. Thus multiple web sites are able to use a single service provider in this mode of operation. The STA 330 is not an SSL proxy but provides the content and communications interfacing for the web server and the trusted secure communication channel 360 with the security module 310.

Examples of the validation request provided to the user 380 in the trusted secure communication channel 360 include but are not limited to embedding a message with steganography, a digital watermark, a digital certificate, a text seal, an image seal, and a Turing test. Examples of Turing tests include completely automated public Turing test to tell computers and humans apart (CAPTCHA), recursive Turing tests (RTTs) and automated Turing tests (ATTs). Such validation requests providing varying complexity to malicious agents in trying to achieve successful MITM attacks for example.

Importantly, in either embodiment the security module 210 (310) does not require the same display capabilities as the laptop computer 200 (300). For example, the information provided on the user's security module 310 is optionally "George Washington," indicating that the information provided by the transactor should include a watermark of George Washington to be valid; this is accomplishable for example via a small LCD character display, via a speaker, or even via a set of LEDs each with an associated watermark. As such the security module is manufacturable at low cost. Such approaches render false generation of potential transactions more difficult as every transaction optionally includes any of the plurality of watermarks for that individual or organization. Alternatively, the watermarks are generic to the system and may have been provided to the user 380 independently of the establishment of the secure communication channel 360. Optionally the information relating to watermarks or the transactor may be periodically revised and communicated to the user's security module during other activities, not necessarily associated with a transaction, or may be provided when they physically visit an office associated with the transactor. Of course, providing a visual display for presenting the watermark provides the most flexibility since each document is then watermarkable with a different unique image.

In accordance with another embodiment of the invention, multiple web sites, for example a server farm or server farms, can use the same Secure Transaction Appliance as a service or multiple Secure Transaction Appliances as service providers, hereinafter referred to as STA service providers. Optionally, each web site is independent of, and does not communicate with, each other. As a result each web site interacts with an STA service provider to establish a secure channel with security modules and to give the STA service provider appropriate digital content to transform with the process, i.e. digitally watermark. The web sites would normally do all of the physical communication with the user's browser and security module while brokering the trusted path between the security module and the STA service provider. In this manner the web sites would be getting confirmation from the STA service provider in respect of user authentication, authorization of transactions, etc.

In this STA service provider model, the web sites interact with a user system and access the STA service provider to establish a secure channel, within the current web site/web browser session, authenticate the user, transform content and receive authorization/confirmation/digital signatures, etc. Optionally, the STA service provider also communicates out of band from the web site/web browser session with for example the security module. When the security module comprises a cellular telephone, the STA service provider optionally communicates via Short Message Service (SMS) to the cellular telephone, and therefore out of band of the other web site/web browser communication.

Optionally, in each embodiment the browser plug in 204 (304) handles the interactions with the security module 210 (310) by processing content within the web pages being rendered by the web browser 202 (302). Thus the same HTTP traffic and Internet session is usable to communicate with the security module 210 (310) requiring no "out-of-band" channel or communications.

Numerous other embodiments may be envisaged without departing from the spirit or scope of the invention.

What is claimed is:
1. A method comprising:
receiving from a transaction server at a secure transaction device electronic content and a tag relating to a known portion of the electronic content, wherein the tag comprises a hypertext markup of the electronic content;
associating with the tag first electronic data for use in verifying the known portion of the electronic content;
establishing a first communication path between the secure transaction device and a security module comprising at least one of a removable peripheral memory storage device and a wireless device connected to a user system associated with a user, said secure transaction device being separate from said user system, the first commu- nication path including the secure transaction device disposed between the transaction server and the user system;

establishing a second communication path between the secure transaction device and the user system; and initiating an authorization process for being performed in conjunction with the security module, the authorization process comprising:

providing the known portion of the electronic content via the user system for presentation to the user;

providing the first electronic data to the user via the security module for authorizing the electronic content, wherein the known portion of the electronic content is verified by the user;

receiving from the user an indication that the known portion of the electronic content is authorized, wherein receiving the indication comprises receiving via the security module a user input; and digitally authorizing the electronic content in response to the indication.

2. A method according to claim 1 wherein the first communication path is a trusted path.

3. A method according to claim 1 wherein, receiving from the user an indication comprises providing a confirmation signal to the secure transaction device.

4. A method according to claim 1 wherein,
the first communication path is via a first network; and
the second communication path is via a second network.

5. A method according to claim 1 wherein, initiating an authorizing process comprises providing a response to the secure transaction device to continue with a transaction.

6. A method according to claim 1 wherein, the secure transaction device comprises at least one of a server and a thin-client.

7. A method according to claim 1 wherein, the first electronic data is responsive to a process in execution on the security module, the process operating in dependence upon a cryptographic key stored within the security module.

8. A method as in claim 1, comprising:

communicating between said secure transaction device and said security module using a secure communication channel; and modifying, by said secure transaction device, at least a portion of the electronic content, in response to said first electronic data.

9. A method according to claim 1 wherein providing the known portion of the electronic content includes providing at least one of a digital watermark, a predetermined portion of a digital watermark, a digital certificate, a text seal, an image seal, a steganographic message, a steganographic image, a known portion of the first electronic document, and a Turing test.

10. A method according to claim 1 wherein providing the first electronic data includes providing at least one of a digital watermark, a predetermined portion of a digital watermark, a digital certificate, a text seal, an image seal, a steganographic message, a steganographic image, a known portion of the first electronic document, and a Turing test.

11. A method comprising:

receiving from a transactor at a secure transaction device electronic content and a tag associated with a known portion of the electronic content, the electronic content for transmission to a user system associated with a user, wherein the tag comprises a hypertext markup of the electronic content;

associating with the tag first electronic data for use in verifying the known portion of the electronic content;

communicating between said secure transaction device and said transactor using a secure communication channel, said secure transaction device being separate from said user system, the secure communication path including the secure transaction device disposed between the transaction server and the user system;

modifying, by said secure transaction device, at least the known portion of the electronic content in response to at least one of the transactor, the user, the tag, and the electronic content;

associating with the tag second electronic data, the second electronic data providing the user an association with the first electronic data;

storing within a memory of the secure transaction device the modified electronic content and second electronic data;

establishing a first communication path between the secure transaction device and a user security module comprising at least one of a removable peripheral memory storage device and a wireless device coupled to the user system;

transmitting the modified electronic content for display to the user on the user system;

transmitting the second electronic data to the user via the user security module; and verifying authenticity of the modified electronic content in dependence upon the second electronic data, wherein the known portion of the electronic content is verified by the user;

receiving from the user an indication that the known portion of the electronic content is authorized, wherein receiving the indication comprises receiving via the security module a user input; and digitally authorizing the electronic content in response to the indication.

12. A method according to claim 11 further comprising:

establishing a second communication path between the secure transaction device and the user system;

transmitting via the second communication path the modified electronic content for display to the user on the user system;

transmitting via the first communication path the second electronic data for display to the user on the security module; and providing an indication of said verification to the secure transaction device.

13. A method as in claim 11, comprising presenting to said user, by said secure transaction device, at least a portion of one of the group: said tag, said electronic data.

14. A method as in claim 11, wherein said secure communication channel between said secure transaction device and said transactor also passes through said user system.

* * * * *